US012574582B2

(12) United States Patent
Anand et al.

(10) Patent No.: US 12,574,582 B2
(45) Date of Patent: Mar. 10, 2026

(54) PRIVACY-PRESERVING CONTENT DELIVERY

(71) Applicant: Google LLC, Mountain View, CA (US)

(72) Inventors: Rishav Anand, Mountain View, CA (US); Steven Guy Avery, Santa Clara, CA (US); Akhil Dhavala, Palo Alto, CA (US); Sittichai Jiampojamarn, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/560,437

(22) PCT Filed: Dec. 28, 2022

(86) PCT No.: PCT/US2022/054107
§ 371 (c)(1),
(2) Date: Nov. 13, 2023

(87) PCT Pub. No.: WO2024/144766
PCT Pub. Date: Jul. 4, 2024

(65) Prior Publication Data
US 2025/0088692 A1 Mar. 13, 2025

(51) Int. Cl.
*H04N 21/2668* (2011.01)
*H04N 21/25* (2011.01)

(52) U.S. Cl.
CPC ....... *H04N 21/2668* (2013.01); *H04N 21/251* (2013.01)

(58) Field of Classification Search
CPC .......................... H04N 21/2668; H04N 21/251
See application file for complete search history.

(56) References Cited

U.S. PATENT DOCUMENTS

| 5,583,763 A | 12/1996 | Atcheson et al. |
| 6,018,738 A | 1/2000 | Breese et al. |
| (Continued) | | |

FOREIGN PATENT DOCUMENTS

| WO | WO 2022036183 | 2/2022 |
| WO | WO 2022197304 | 9/2022 |

OTHER PUBLICATIONS

International Search Report and Written Opinion in International Appln. No. PCT/US2022/054107, mailed on Jul. 17, 2023, 9 pages.
(Continued)

*Primary Examiner* — Nnenna N Ekpo
(74) *Attorney, Agent, or Firm* — Fish & Richardson P.C.

(57) ABSTRACT

Methods, systems, and apparatus, including medium-encoded computer program products for selecting and presenting content in privacy preserving manners. A digital component request can be received from a client device at a first content platform, and can request digital components for presentation and can include contextual data describing an environment in which the digital component will be presented. Based on the contextual data, a client device user can be added to interest groups. Based on the contextual data, a digital component is selected for distribution to the client device. The selected digital component and instruction data are provided to the client device causing the client device to: update a membership count that indicates that the user has been added to the interest group; and include the selected digital component in a digital component selection process to select a digital component for presentation to the user of the client device.

17 Claims, 4 Drawing Sheets

(56) References Cited

U.S. PATENT DOCUMENTS

| | | | |
|---|---|---|---|
| 6,049,777 | A | 4/2000 | Sheena et al. |
| 6,412,012 | B1 | 6/2002 | Bieganski |
| 7,734,641 | B2 | 6/2010 | Kanigsberg et al. |
| 8,306,975 | B1 | 11/2012 | Eldering |
| 8,554,767 | B2 | 10/2013 | Song et al. |
| 9,218,392 | B1 | 12/2015 | Zgraggen et al. |
| 9,836,533 | B1 | 12/2017 | Levi et al. |
| 10,296,525 | B2 | 5/2019 | Brewington |
| 11,003,726 | B2 | 5/2021 | Hu |
| 11,055,739 | B2 | 7/2021 | Balasubramanian et al. |
| 11,538,034 | B2 * | 12/2022 | Oosthuizen ............ G06Q 30/06 |
| 2007/0089129 | A1 * | 4/2007 | Verhaegh ............. H04N 21/466 |
| | | | 725/35 |
| 2008/0294624 | A1 | 11/2008 | Kanigsberg et al. |
| 2010/0228715 | A1 | 9/2010 | Lawrence |
| 2013/0297590 | A1 | 11/2013 | Zukovsky et al. |
| 2020/0177595 | A1 * | 6/2020 | Rakshit .................... G06N 3/08 |
| 2021/0056140 | A1 | 2/2021 | Zhang et al. |
| 2022/0278828 | A1 * | 9/2022 | Wang ...................... H04L 9/085 |
| 2022/0405407 | A1 * | 12/2022 | Bai ........................ G06N 20/00 |

OTHER PUBLICATIONS

International Preliminary Report on Patentability in International Appln. No. PCT/US2022/054107, mailed on Jul. 10, 2025, 7 pages.

* cited by examiner

PRIVACY-PRESERVING CONTENT DELIVERY

CROSS-REFERENCE TO RELATED APPLICATIONS

This application is a National Stage Application under 35 U.S.C. § 371 and claims the benefit of International Application No. PCT/US2022/054107, filed Dec. 28, 2022, the entirety of which is incorporated herein by reference for all purposes.

TECHNICAL FIELD

This specification relates to data privacy, data security, and machine learning.

BACKGROUND

Content delivery can include providing relevant information to users. Data privacy relates to controlling access to user data, and can include prohibiting the tracking of users who browse web sites.

Data security and user privacy are vital in systems and devices connected to public networks, such as the Internet. The enhancement of user privacy has led many developers to change the ways in which user data is handled. For example, some browsers are planning to deprecate the use of third-party cookies.

SUMMARY

This specification describes technologies that enable the delivery of content relevant to a user without compromising user privacy or data security. To provide relevant content while enhancing user privacy, content platforms can predict which interest groups are relevant to a user based on individual interactions between the user and the content platform and/or its affiliates, but not based on user tracking across resources of multiple different content platforms. Instead, a content platform can predict, for each individual request for content received from a client device of a user, one or more user interest groups for the user based on the request and contextual data received with the request. The content platform can then request that the client device update information stored at the client device that is related to interest groups specific to that content platform. Each content platform can use the information stored at the client device that is related to interest group predictions and provider-specific logic provided to the client device to recommend content of interest to the user. As users interact repeatedly with the content platform and/or its affiliates, predictions relating to interest groups are reinforced, and the confidence of the user's interest predictions can increase. Since each content platform's interest group membership information for a user is stored at the client device of the user and the logic of each content platform is executed locally at the client device, no entity outside of the client device has access to cross site data (e.g., information about the user's activity across multiple web sites published by different publishers), thereby enhancing user privacy.

One aspect features receiving, from a client device and by a first content platform, a digital component request that requests one or more digital components for presentation at the client device and that includes contextual data describing an environment in which the digital component will be presented. Based on the contextual data, it is determined to add a user of the client device to one or more first interest groups. Based on the contextual data, a selected digital component is selected for distribution to the client device. The selected digital component and instruction data are provided to the client device and cause the client device to: (i) update, for each of the one or more first interest groups, a membership count that indicates that the user has been added to the interest group; and (ii) include the selected digital component in a digital component selection process performed by the client device to select, from multiple digital components received from multiple content platforms, a given digital component for presentation to the user of the client device.

One or more of the following features can be included. The instruction data can include a confidence logic module that includes executable instructions configured to produce a confidence score that indicates a likelihood that a particular user is interested in the digital component. The instruction data can include a reference to confidence logic module located on a separate computing system that is configured to produce a confidence score that indicates a likelihood that a particular user is interested in the digital component. A membership count can include a number of times that the user has been added to the interest group. A membership count can include an interest group confidence index that indicates a predicted likelihood that a user is interested in the interest group.

The digital component selection process performed by the client device can include: (i) executing multiple confidence logic modules, where each confidence logic module is provided by a different content platform of the multiple content platforms and is configured to produce a confidence score for each of one or more digital components of the content platform; and (ii) selecting, based at least in part on the confidence scores, the given digital component for presentation to the user.

The following operations can be performed: (i) receiving, from the client device and by the first content platform, an additional digital component request that requests one or more additional digital components for presentation at the client device and that comprises additional contextual data describing an environment in which the additional digital component will be presented; (ii) determining, based on the contextual data, to add a user of the client device to one or more second interest groups, wherein at least one of the second interest groups differs from each of the first interest groups; (iii) selecting, based on the contextual data, a second digital component for distribution to the client device; and (iv) providing, to the client device, the second digital component and additional data that causes the client device to: update, for each of the one or more second interest groups, a membership count that indicates a number of times the user has been added to the interest group; and include the second digital component in an additional digital component selection process performed by the client device to select, from multiple digital components received from multiple content platforms, an additional given digital component for presentation to the user of the client device.

The digital component request and the additional digital component request can be configured to prevent the first content platform from correlating the digital component request with the additional digital component request. Determining, based on the contextual data, to add a user of the client device to one or more first interest groups can include processing an input that includes the contextual data using a machine learning model that is trained to produce as output group identifiers for interest groups.

Particular embodiments of the subject matter described in this specification can be implemented so as to realize one or more of the following advantages. Using the techniques of this specification, information useful in selecting content for a user is maintained on the user's client device, where its use can be controlled by the user. In addition, content platforms can supply proprietary confidence logic that can be applied at the client device or at a trusted server to determine the relevance of content to a particular user based on predictions relating to user interest. Therefore, using the techniques of this specification, users can receive from content platforms information that is likely to be relevant to the user without compromising the user's privacy. In addition, as a user continues to interact with a content platform, confidence in predictions can increase, improving the likelihood that relevant content is displayed.

Historically, third-party cookies (e.g., cookies from a different domain than the resource being rendered by a client device) have been used to collect data from client devices across the Internet. However, some browsers and device platforms block the use of third-party cookies and third-party cookies are increasingly being removed from use, thereby preventing the collection of data using third party cookies. This creates a challenge when attempting to utilize collected data to make inferences, segment data, or otherwise utilize data to enhance online browsing experiences, e.g., by selecting content relevant to users based on the data collected using third party cookies. In other words, without the use of third-party cookies, much of the data previously collected is no longer available, which prevents computing systems from being able to use that data to group users based on shared interests or activities performed by the users at particular web pages or other resources, to enhance the online experience for users, and/or to present relevant content to users.

The techniques described herein can solve hurdles that may arise from the eradication of third-party cookies. For example, content platforms can add a user to one or more user interest groups that indicate a topic of interest of the user or another characteristic of the user each time a request for content is sent to the content platform from the client device of the user. The interest group information is then transmitted to the client, so user privacy is preserved. If the user is already a member of a user group, the client device can update a metric (e.g., a count) related to the number of times the user has been added to the group. However, the steps can be taken to ensure that the content platform cannot correlate multiple requests for content from the same user and therefore cannot track users across multiple requests, multiple web sites, or multiple domains. For example, metrics related to interest groups of a user are stored only on the client device of the user and such data is not shared with content platforms to preserve user privacy. Instead, by maintaining information related to user groups to which the content platform added the user over time at the client device, information related to topics of interest of the user across multiple requests, web sites, domains, etc., can be used to select relevant content for the user without exposing such information anywhere other than the user's device where such information can be controlled by the user. This enables accurate selection of relevant content for users without exposing user data to other parties. Enabling such accurate selection prevents distribution of irrelevant content to users that the users would not interact with, which reduces wasted bandwidth in sending such irrelevant content to client devices. Aggregated over millions of client devices, such bandwidth savings are substantial.

Using the techniques described in this document, user interest information of users can be created and updated at client devices of the users without transmitting third-party cookies across a public network, e.g., the Internet. By doing so, user privacy is protected, network bandwidth is reduced, and computational resources of the server that would receive and process the cookies is reduced Machine learning models can be used to predict user interest groups that are related to topics that are likely to be of interest to a user based on contextual data included in a single request for content. As the machine learning models operate on contextual data of a single request, such machine learning models can be executed by the content platforms rather than by the client device of the user, which, since content platforms include more computational resources, enables more complex machine learning models (e.g., neural networks having greater numbers of layers and/or neurons) to be used relative to those that can effectively run on client devices. In addition, this structure increases the speed at which the machine learning models are executed, which is critical in selecting and presenting additional content (e.g., digital components) with primary content of web pages or applications. In addition, digital components can be stored on the client device for selection and presentation to the user of the client device, which further reduces the latency in selecting and presenting a digital component.

Delays in providing content, e.g., digital components, in response to requests can result in page load errors at the client devices or cause portions of an electronic document to remain unpopulated even after other portions of the electronic document are presented at the client devices. Also, as the delay in providing the digital component to the client device increases, it is more likely that the electronic document will no longer be presented at the client device when the digital component is delivered to the client device, thereby negatively impacting a user's experience with the electronic document. Further, delays in providing the digital component can result in a failed delivery of the digital component, for example, if the electronic document is no longer presented at the client device when the digital component is provided.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for selecting and distributing digital components to client devices in ways that protect user privacy by determining relevant content based on a user's aggregate interests without providing user information to unaffiliated web sites.

Ensuring the privacy of personal data is a requirement of many computing systems, especially those connected to public networks such as the Internet. Some consumers who do not trust that strong privacy protection will be enforced by a system will simply choose not to use that system.

However, while it is important to protect user privacy, it remains beneficial to users to receive content relevant to their interests. The techniques described in this specification use predictions relating to user interests of a user based on contextual data related to resources viewed by the user, without enabling content platforms or other entities to track the user's activity across multiple web sites.

Figure 1A:
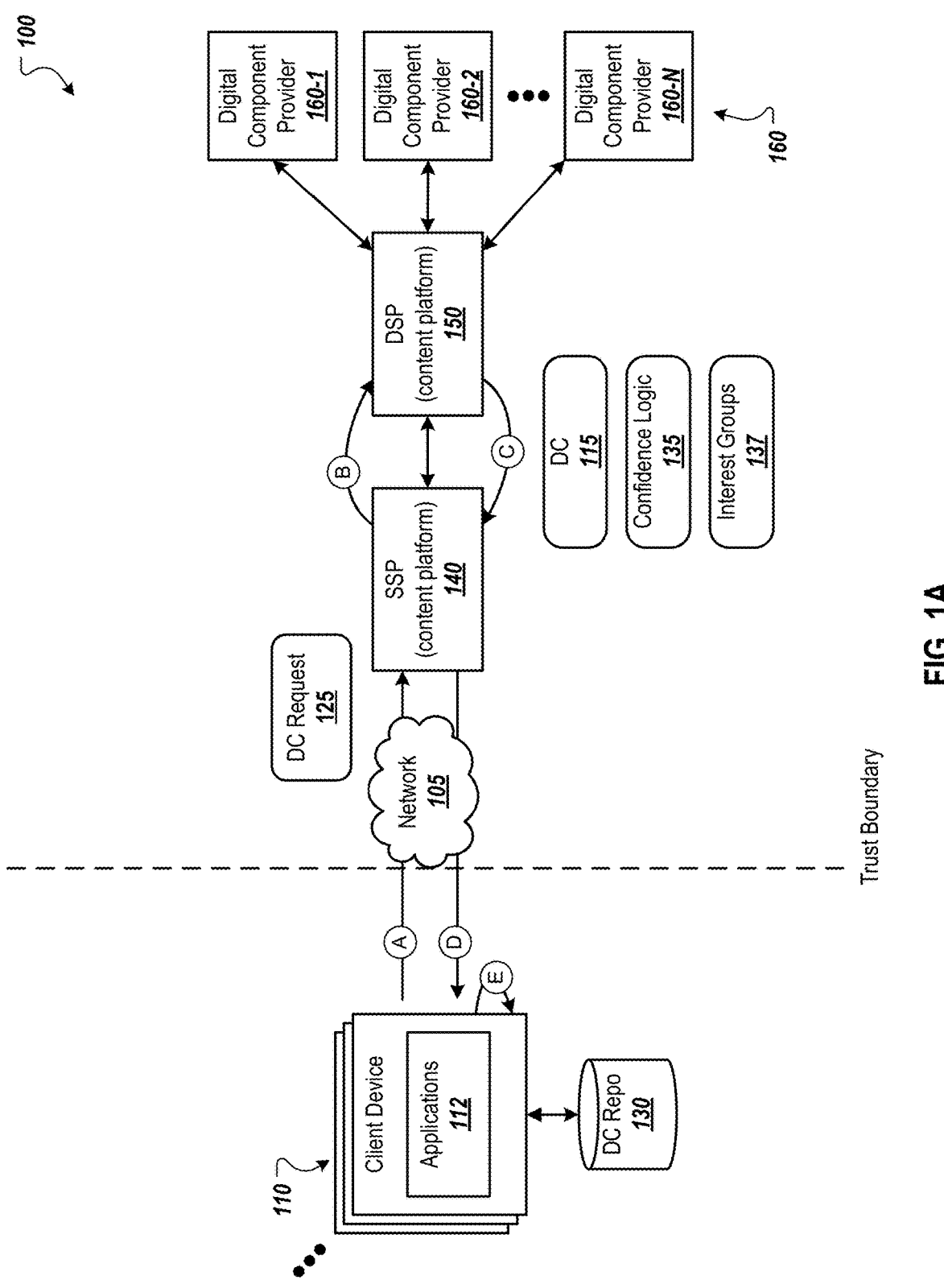
FIG. 1A shows an example environment for privacy-preserving content delivery.

FIG. 1 is a block diagram of an example environment 100 in which digital components 115 are distributed to client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to a content platform, which can include supply side platforms (SSPs) 140 and/or demand side platforms (DSPs). The network 105 can also connect the various content platforms to one another and/or to digital component providers 160, e.g., to servers of the digital component providers 160. Thus, content platforms can distribute digital components of multiple digital component providers to client devices 110. Further, while the digital component providers 160 are illustrated as outside the content platform, a content platform can both contain digital component providers 160 and communicate with digital component providers 160 via the network 105 that are outside the content platform.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device 110 can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components 115 with the content of the electronic resources. A digital component slot is an area of an electronic resource (e.g., web page or application page) for displaying a digital component 115. A digital component slot can also refer to a portion of an audio and/or video stream (which is another example of an electronic resource) for playing a digital component 115.

An electronic resource is also referred to herein as a resource for brevity. For the purposes of this document, a resource can refer to a web page, application page, application content presented by a native application, electronic document, audio stream, video stream, or other appropriate type of electronic resource with which a digital component 115 can be presented.

As used throughout this document, the phrase "digital component" refers to a discrete unit of digital content or digital information (e.g., a video clip, audio clip, multimedia clip, image, text, or another unit of content). A digital component 115 can electronically be stored in a physical memory device as a single file or in a collection of files, and digital components 115 can take the form of video files, audio files, multimedia files, image files, or text files and include advertising information, such that an advertisement is a type of digital component 115. For example, the digital component 115 may be content that is intended to supplement content of a web page or other resource presented by the application 112. More specifically, the digital component 115 may include digital content that is relevant to the resource content (e.g., the digital component 115 may relate to the same topic as the web page content, or to a related topic). The provision of digital components 115 can thus supplement, and generally enhance, the web page or application content.

A client device 110 can also include, or be coupled to, a digital component repository 130, which can be any storage system appropriate for storing digital components 115. For example, the digital component repository 130 can be a persistent storage system such as a database or file system, or a transient storage system such as a dedicated area of random access memory (RAM).

When the application 112 loads a resource that includes a digital component slot, the application 112 can generate a digital component request 125 that requests a digital component 115 for presentation in the digital component slot. In some implementations, the digital component slot and/or the resource can include code (e.g., scripts) that cause the application 112 to request a digital component 115 from an SSP 140. A digital component request 125 sent by a client device 110 can include non-sensitive data, such as contextual data, generic keyword and/or a query string.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

As described above, digital component request 125 can include contextual data, which is generally considered non-sensitive. The contextual data can describe the environment in which a selected digital component 115 will be presented. The contextual data can include, for example, coarse location information indicating a general location of the client device 110 that sent the digital component request 125, a resource (e.g., website or native application) with which the selected digital component 115 will be presented, a spoken language setting of the application 112 or client device 110, the number of digital component slots in which digital components 115 will be presented with the resource, the types of digital component slots, text and/or images that are, or will be, displayed, and other appropriate contextual information.

An SSP 140 is a technology platform implemented in hardware and/or software that automates the process of obtaining digital components 115 for the resources. Publishers of resources can use an SSP 140 to manage the process of obtaining digital components 115 for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components 115 for presentation with the resources and/or applications. A DSP 150 can interact with multiple supply-side platforms SSPs on behalf of digital component providers 160 to provide digital components 115 for presentation with the resources of multiple different publishers. Digital component providers 160 can create (or otherwise publish) digital components 115 that are presented in digital component slots of publisher's resources.

The DSP 150 can further provide to client devices 110 one or more confidence logic modules 135 that can be encoded as computing instructions that indicate, for each DSP 150, a confidence score indicating a confidence that a particular digital component 115 is responsive to a digital component request 125. For example, a confidence score can indicate the predicted likelihood that that user who created the digital component request 125 will interact with the particular digital component 115. The confidence logic in the confidence logic module 135 can be expressed in any appropriate programming language, such as Python or JavaScript, a rules language, or any other appropriate technique for determining a confidence measure. In some implementations, the confidence logic module 135 can include a reference (e.g., a Uniform Resource Locator) to a trusted computing resource that provides the computing instructions and returns a result to the client device 110.

Additionally, the DSP 150 can provide to a client device 110 interest groups 137 relevant to a DC request 125. The interest groups 137 can be expressed in any appropriate data format. For example, interest groups 137 can be expressed in JavaScript Object Notation (JSON) that includes a reference to the DSP providing the interest groups 137, and one or more tokens (e.g., alphanumeric strings) that represent interest groups. For example, a token might indicate "shoes," "soccer," "mobile phones," and so on.

In some implementations, the DSP 150 can provide an interest group confidence index that indicates a predicted likelihood that a user is interested in the interest group. For example, if a DSP 150 determines that there is 30% confidence that the user is a member of a first interest group, 0% confidence that a user is a member of a second interest group, 90% confidence that the user is a member of a third interest group, and so on, the DSP 150 can provide both the interest groups 137 and the interest group confidence index for each. In the example above, the DSP might provide the following: {{"shoes", 0.3}, {"soccer", 0}, {"mobile phones", 0.9}}, where 0.3, 0 and 0.9 reflect the interest group confidence indices. In another example, the DSP can provide corresponding vectors, such as a vector of interest groups, ["shoes," "soccer," "mobile phones"], and a vector of interest group confidence indices, [0.3. 0, 0.9].

Client devices 110 can store indications of interest groups 137, including aggregate indications of interest groups 137. For each user of the client device 110, the client device can store, for each DSP and for each interest group, an indication of the frequency that that interest group has been encountered. For example, if DSP $D_1$ has five interest groups, $I_1 \ldots I_5$, e.g., corresponding to "shoes," "soccer," "mobile phones," "cookware" and "travel," the client device can begin with a count of zero for each of $I_1 \ldots I_5$, which can be expressed as a vector [0,0,0,0,0]. If the content platform first provides an indication of interest groups 137 for $D_1$ that includes $I_1$ and $I_2$, the client device can increment the corresponding vector entries such that vector becomes [1,1, 0,0,0]. (If the $D_1$ provides interest group confidence indices, the client device can sum the indices, or combine the indices using other techniques.) If the content platform then provides a second indication of interest groups 137 for $D_1$ that includes $I_1$ and $I_5$, the client device can increment the corresponding vector entries such that vector becomes [2,1, 0,0,1]. In this example, interest by the user in interest group $I_1$ is a stronger signal of actual interest as compared to the other interest groups. Note that a second DSP, $D_2$, can have different interest groups, including a different number of interest groups, e.g., $I_1 \ldots I_7$, and the values in the vector for $D_2$ are not influenced by the information in $D_1$. Thus, user information relating to interactions between a user and each DSP is isolated, maintaining user privacy.

An example process for selecting and providing a digital component 115 for presentation at a client device 110 is illustrated in stages A-E, which illustrate a flow of data between the components of the environment 100.

In stage A, the application 112 sends a digital component request 125 over the network 105 to a content provider, such as an SSP 140. As described above, the application 112 can send a digital component request to request a digital component 115 for presentation in a digital component slot of a resource being presented by the application 112. The digital component request 125 can include user data and contextual data. In stage B, the SSP 140 forwards the digital component request 125 to one or more DSPs 150.

In stage C, each DSP 150 can determine or predict that the client device 110 which sent the request is a member of particular interest groups 137, and provide those interest groups 137 to the SSP 140. The DSP 150 can further send one or more confidence logic modules 135 that can be used by the client device 110 to determine digital components 115 that are responsive to the digital component request 125. In addition, the DSP 150 can send digital components 115 that are potentially responsive to the digital component request 125 for consideration by the client device 110, as described below. The client device 110 can store or cache such digital components 115 in its digital component repository 130. In some cases, the DSP 150 can determine that the client device 110 already possesses, or has access to, the responsive digital components 115 and/or confidence logic module(s) 135, and therefore does not have to provide the digital components 115 and/or confidence logic module(s) 135.

In stage D, the SSP 140 sends the interest groups 137, digital components 115, and/or confidence logic module(s) 135 as received from the DSP 150. In some implementations, the SSP 140 can filter digital components 115 and/or selection parameters prior to sending the digital components 115 and/or selection values to the secure distribution system 120. For example, the SSP 140 can filter digital components 115 and/or selection parameters based on publisher controls specified by the publisher of the resource being presented by the application 112. In a particular example, a publisher of a web page about a particular event may define, as a publisher control, that digital components 115 related to another event may not be presented with this web page. The SSP 140 can filter based on rules or other data provided by the publisher.

The client device 110 can receive from the SSP 140 the digital components 115, confidence logic module(s) 135 and interest groups 137. The client device 110 can aggregate the interest groups 137 with previously received interest group information to create aggregate interest group information, e.g., by incrementing values in a vector, as described above.

The client device 110 can use the aggregate interest group information and the confidence logic module(s) 135 provided by the various DSPs to select a digital component 115 from among the received digital components 115 for presentation to the client device 110. For example, the client device 110 can execute, for each DSP, one or more confidence logic module(s) 135 provided by that DSP. Each such confidence logic module 135 can evaluate the likelihood that a user is interested in a digital component 115 (e.g., will interact with the digital component 115). To make such a determination, the confidence logic module 135 can access the aggregate interest group information for that DSP and use the aggregate interest group information to produce a confidence score ("score" for brevity) that indicates the confidence of the DSP that a particular user is interested in a particular digital component 115. The client device 110 can then select and present the digital component 115 using the score. In some implementations, the client device 110 can send a message to the content platform indicating which digital component 115 was displayed.

Figure 1B:
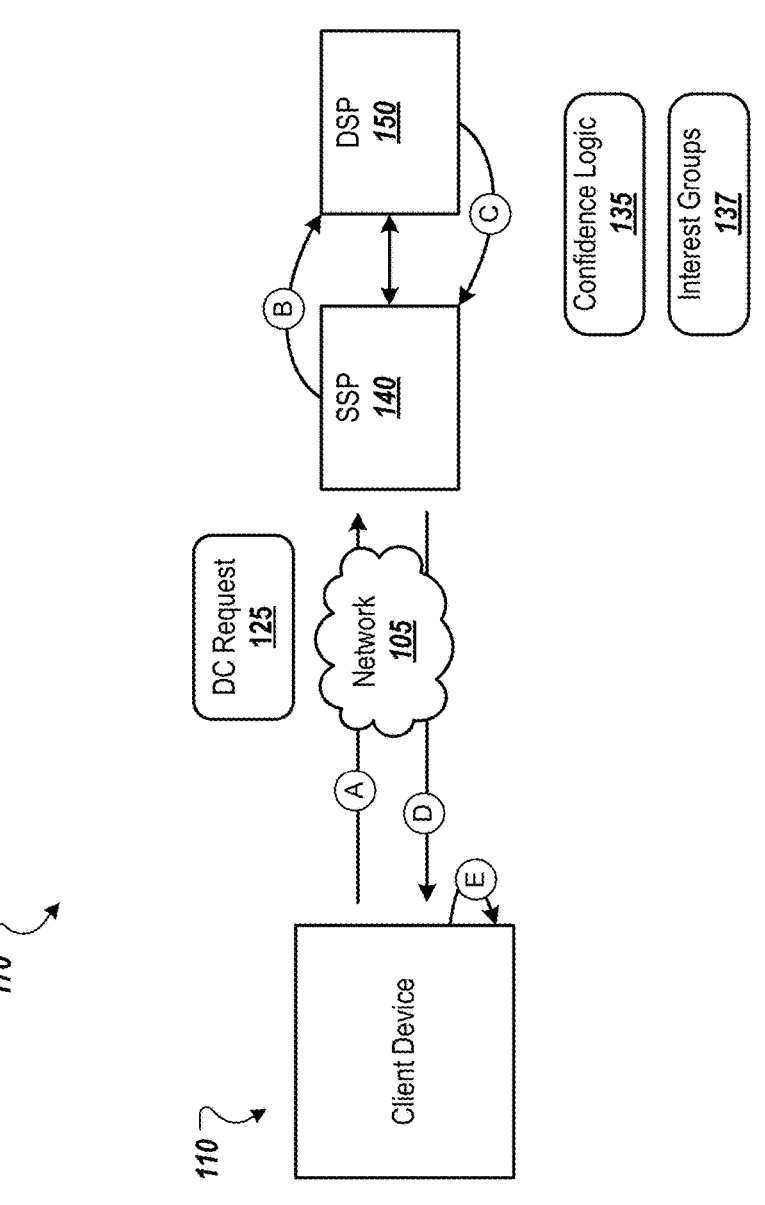
FIG. 1B shows an example of privacy-preserving content delivery.

FIG. 1B shows an example 170 of privacy-preserving content delivery. In stage A of this example 170, a user on a client device 110 issues a first digital component request 125 over a network 105 to an SSP 140, which provides (stage B) the digital component request 125 to a DSP 150. In this example 170, the digital component request 125 might relate to a particular model of hiking shoe.

Upon receiving the digital component request 125, the DSP 150 determines categories for the digital component request 125, e.g., using a machine learning model as described further below. While practical examples can include hundreds, thousands or more categories, for clarity, in this example 170, the DSP has five total categories from which to select: "active shoes," "outdoor apparel," "hiking equipment," "indoor apparel," and "bowling equipment."

In this example 170, the DSP 160 can determine that the following categories apply: "active shoes," "outdoor apparel" and "hiking equipment." The DSP 150 can create a vector indicating the assignment of the digital component request 125 to categories, with elements of the vector corresponding to the order "active shoes," "outdoor apparel," "hiking equipment," "indoor apparel," and "bowling equipment," resulting in the vector $[1,1,1,0,0]$. As noted above, categories can be specific to each DSP 150.

In stages C and D, the DSP 150 can return these interest groups 137 to the client device 110 via the SSP 140 and the network 105. Additionally, the DSP 150 can return the confidence logic 135 to be used by the client device 110 during the process of selecting a digital component 115 to display.

The client device 110 can then issue a second request for a digital component 115, in this case a backpack. The DSP 150 can determine that "backpack" relates to categories "outdoor apparel," "hiking equipment" and "indoor apparel." (As described above, in some implementations, the DSP 150 can determine that the association with "hiking equipment" is stronger than the association with "indoor apparel" or "outdoor apparel," and the DSP 150 can return interest group confidence indices.) The resulting vector is $[0,1,1,1,0]$, and that vector can be transmitted to the client device 110.

The client device 110 has thus obtained two vectors, $[1,1,1,0,0]$ and $[0,1,1,1,0]$. In stage E, the client device 110 can sum these vectors to obtain the aggregate vector $[1,2, 2,1,0]$, which can indicate that the user has the strongest interest in "outdoor apparel" and "hiking equipment." That aggregate vector can be provided to the confidence logic (135 in FIG. 1A) provided by the DSPs 150. The client device 110 can execute the confidence logic of the DSPs 150 using the aggregate vector to determine confidence scores for the digital components (115 in FIG. 1A) stored by the client device 110, and the client device can select and display the digital component with the highest confidence score and present that digital component to the user.

Figure 2:
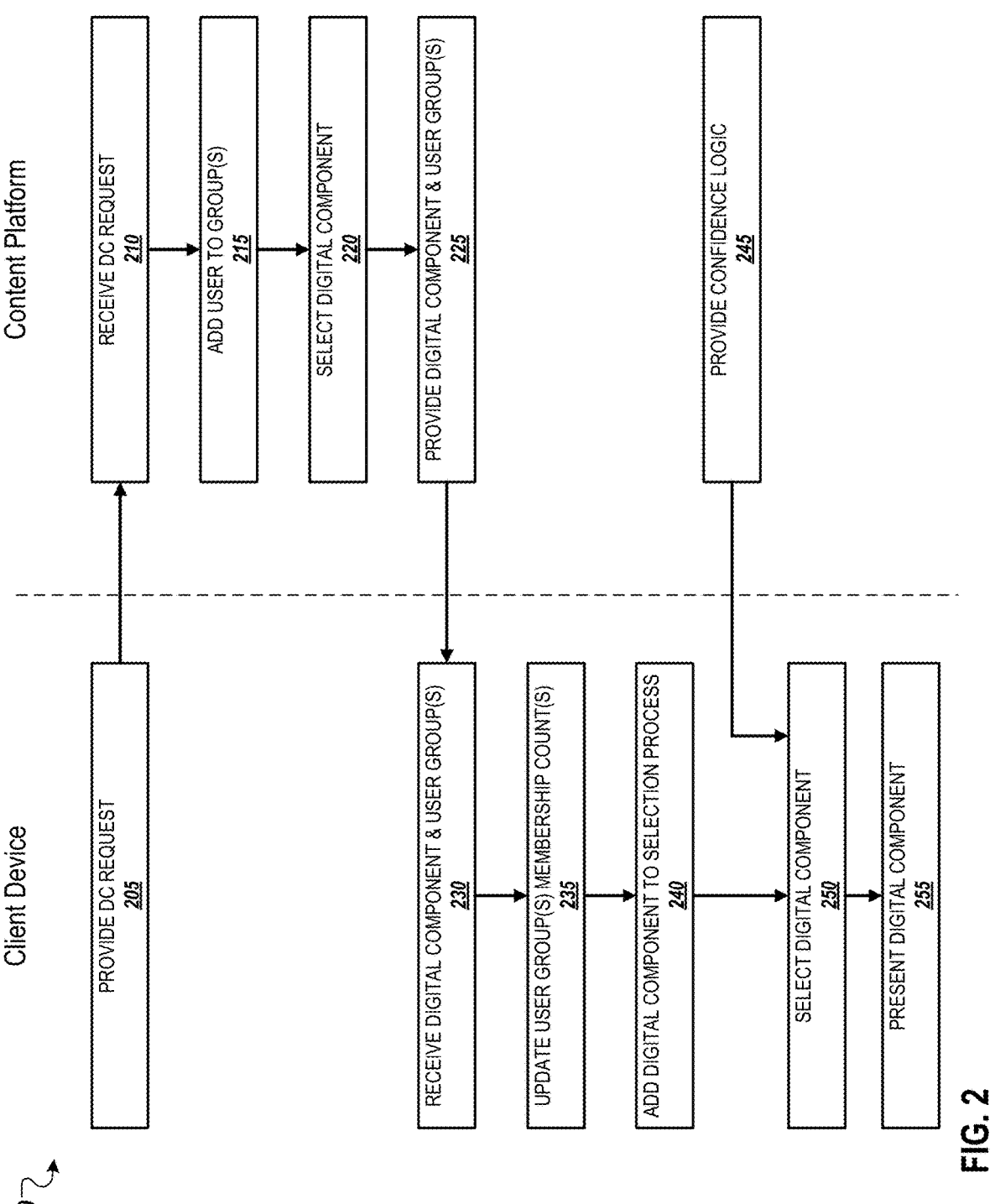
FIG. 2 is a flow diagram of an example process for privacy-preserving content delivery.

FIG. 2 is a flow diagram of an example process for privacy-preserving content delivery. For convenience, the process 200 will be described as being performed by the components of a system for privacy-preserving content delivery, e.g., client devices 110 and content platforms 140, 150 of FIG. 1 appropriately programmed to perform the process. Operations of the process 200 can also be implemented as instructions stored on one or more computer readable media, which may be non-transitory, and execution of the instructions by one or more data processing apparatus can cause the one or more data processing apparatus to perform the operations of the process 200. One or more other components described herein can perform operations of the process 200.

The client device provides (205) and the content platform receives (210) a digital component request that requests one or more digital components that can be presented at the client device. The request can include contextual data describing an environment in which the digital component will be presented. In addition, as described above, content platforms can distribute digital components provided by multiple digital component providers. Although in this example a single content platform is shown, the digital component request can be provided to multiple content platforms, e.g., to multiple DSPs.

The client device can provide and the content platform can receive the request using any appropriate technique. For example, the digital component request can be transmitted and received using HyperText Transport Protocol (HTTP) or HTTP-Secure (HTTP-S). In another example, the content provider can include an Application Programming Interface (API), which, when called by the client device, enables the client device to provide a digital component request.

The content platform can determine that the user of the client device should be added (215) to one or more interest groups. The determination can be made, at least in part, based on the contextual data. In some implementations, the content platform can include a model that uses the contextual data to determine which interest groups, if any, to which the user can be added. The model can take any appropriate form. For example, the model can be a machine learning model (e.g., a deep neural network (DNN), a logistic regression model, a decision tree or other suitable machine learning models) that is configured to output interest groups based on contextual data. The content platform can process an input that includes the contextual data using the machine learning model, and the model can produce as output indicators associated with interest groups. The indicators can be interest group identifiers that uniquely identify the interest groups. The output can also include an interest group confidence index that indicates the likelihood that the client device should be added to each of the one or more interest groups. In another example, the model can be a set of rules that include conditions and results such that, when a condition is satisfied, a result is produced. The conditions can depend on the contextual data, and the results can be interest group(s) to which users are assigned.

In one example, the content platform can train a machine learning model to predict topics of interest of a user based on contextual data received in a single digital component request. The model can be trained, for example, based on labeled training data. The labeled training data can include, for each of multiple sets of contextual data, one or more labels that each indicate a topic of interest. When the content platform receives a digital component request that includes contextual data, the content platform can provide the contextual data as input to the machine learning model and receive, as an output of the machine learning model, one or more group identifiers that each identify an interest group corresponding to a topic that is likely to be of interest to a user for which such contextual data was received.

The machine learning model can also be trained to output an interest group confidence index for each interest group. This interest group confidence index for an interest group can indicate a level of confidence that a user for which the contextual data was received would be interested in the topic corresponding to the interest group. The interest group confidence index can be based on the contextual data.

In some implementations, a content platform can use multiple machine learning models, e.g., one for each interest group created by the content platform. A machine learning model for an interest group can be trained to output an interest group confidence index score for the interest group based on the contextual data of a digital component request, e.g., similar to how a machine learning model is trained to output confidence scores for multiple interest groups.

As the machine learning models are executed by content platforms rather than a client device, the machine learning models can be executed on server class computers or machine learning accelerators (e.g., graphics processing units (GPUs), application specific integrated circuits (ASICs), or tensor processing units (TPUs)). This enables more complex and more powerful machine learning models to be used to predict the interest groups for users.

The content platform can then select one or more interest groups for the user based on the interest group confidence indices. For example, the content platform can determine to request that the client device add the user to each interest group that has an interest group confidence index above a specified threshold. In another example, the content platform can determine to request that the client device add the user to a specified number of interest groups having the highest interest group confidence indices, e.g., the top five, ten, or other number of the highest scoring interest groups.

In some implementations, the determination can include an interest group confidence index that indicates a level of interest in an interest group, as described above. For example, a value of 1 can indicate near certainty that an interest group applies, a value of 0 can indicate near certainty that the interest group does not apply, and values between 0 and 1 can indicate relative confidence, e.g., 0.5 indicating 50% certainty. The content platform can provide to the client device the level of certainty for each interest group.

The content platform can select (220) one or more digital components for distribution to the client device. The content platform can select the digital component(s) based on the contextual data of the digital component request. For example, the content platform can select one or more digital component(s) that are relevant to topics of the resource with which the digital component(s) may be presented.

The content platform can also use a machine learning model to select the digital component. For example, a machine learning model can be trained to output, for each of multiple digital components, a relevancy score that indicates a level of relevancy of the digital component to the environment indicated by the contextual data of the digital component request. The content platform can select a specified number of digital components (e.g., a number specified by the digital component request) based on the relevancy scores. The content platform can process an input that includes the contextual information using the machine learning model, and the model can produce an output that describes one or more selected digital components. In some implementations, the model used to determine interest groups can be the same model that is used to determine digital components. For example, such a model can be a DNN configured to produce outputs that describe zero or more interest groups and zero or more digital components.

The content platform provides (225) the selected digital component(s) and instruction data, which can include the data identifying determined interest groups (e.g., the group identifiers for the interest groups), to the client device. The content platform can further provide the confidence scores for one or more interest groups.

The content platform can provide the selected digital component(s) and instruction data using any appropriate technique. For example, if the content platform received the digital component request as an HTTP or HTTP-S GET request, the content platform can provide an HTTP or HTTP-S response that includes the selected digital component and instruction data in the response body. The client device can receive (230) the digital component and instruction data using the corresponding receiving technique, such as receiving an HTTP or HTTP-S response.

In some implementations, providing a digital component can include providing data identifying the digital component without providing the digital component itself. For example, the content platform can provide, for each digital component, a resource locator (e.g., Uniform Resource Locator (URL) or Uniform Resource Identifier (URI)) for a resource from which the client device can download the digital component.

By providing the selected digital component and the instruction data, the content platform causes the client device to: (i) update (235), for each of the one or more interest groups, a membership count that indicates that the user has been added to the interest group (e.g., indicating the number of times a user has been added to the interest group); and (ii) include (240) the selected digital component in a digital component selection process performed by the client device to select, from multiple digital components received from multiple content platforms, a given digital component for presentation to the user of the client device. For example, the instruction data can include instructions that instruct the client device to perform these operations. In another example, the client device (e.g., an application running on the client device) can be configured to perform these operations in response to receiving the digital component(s) and the instruction data.

As described above, in some implementations, the client device can maintain a vector for each DSP that indicates the number of times each interest group has been identified for that DSP. The client device can update that vector in response to receiving the digital component and instruction data. In some implementations, the vector can include interest group confidence indices that reflect the likelihood that the user of a client device should be added to an interest group. The client device can sum the user group confidence indices received from the content platform to create an aggregate user group confidence index for each category.

In some implementations, techniques other than counting instances of an interest group appearing or summing confidence scores can be used. For example, the client platform can use a decaying approach where more recently received interest groups indications (user group confidence indices or instance counts) are weighted more heavily. Decay can be, for example, linear or exponential.

The client device can also add the received digital component(s) to a collection of digital components received in response to the digital component request (per operation 205) for use selecting a digital component. The client device can store the digital components in a digital component repository or in other appropriate storage systems. The collection can include digital components received in response to multiple digital component requests. For example, the collection can include digital components received over a defined time period, e.g., the last week, the last month, or another appropriate time period.

In addition, the content platform can provide (245) to the client device a confidence logic module for the DSP that provided the digital component. In some implementations, the confidence logic module can include executable instructions, in any appropriate form, that can evaluate interest groups for a digital component and provide a confidence score. In some implementations, the confidence logic module can include a reference (e.g., a URL) to a location of the executable confidence logic, and the client device can use the reference to invoke the confidence logic. For example, the client device can download the logic, execute the logic as described below, and then delete the logic or store it for any subsequent digital component requests. In some implementations, the confidence logic model for the DSP can be provided to the client device before a digital component request is received, after a digital component request is received, when the selected digital component and/or user groups are provided to the client device, and so on.

The client device can select (250) the digital component for display. In some implementations, the client device can use one more confidence logic modules. If the confidence logic module contains executable instructions, the client device can execute the instructions to obtain one or more confidence scores related to one or more digital components that are candidates for display. If the confidence logic module contains a reference to executable instructions, the client device can use the reference to invoke the executable instructions and obtain one or more confidence scores related to one or more digital components that are candidates for display.

The client device can use the confidence scores to select a digital component. In some implementations, the client device can determine which interest groups are relevant to the digital component, e.g., by identifying keywords included in the digital component. The client device can then determine the membership count for each interest group, and use the membership counts to produce a confidence score. For example, the client device can sum the membership counts for interest groups of the digital component to produce a confidence score. In another example, some interest groups can be weighted more heavily than other interest groups, and the confidence score can be a weighted sum.

In some implementations, the client device can select the digital component that receives the highest confidence score. If there is a tie for highest score, the client device can break the tie using any appropriate technique. For example, the client device can use a random number or a pseudo-random number to make the selection. In some implementations, the client device can apply a fairness metric. For example, when a digital component from a DSP is selected, when the next opportunity to display the digital component arises, the score for digital components from that DSP can be decremented by a fixed or variable amount. Such score reductions reduce the likelihood that digital components from the same DSP are selected to the exclusion of digital components from other DSPs.

In some implementations, the client device can select a digital component from a set of candidate digital components based on the confidence scores and optionally additional data, e.g., a selection parameter for each digital component and/or a predicted performance of the digital component. The selection parameter can indicate an amount that the content platform is willing to provide to the publisher of a resource with which the digital component will be presented if the digital component is presented with that resource. The predicted performance can indicate a likelihood that the digital component will be interacted with by a user if presented to the user and can be based on the confidence score for the digital component, the contextual data of the digital component request, and/or other appropriate data.

The candidate digital components can include one or more digital components that are provided by each of multiple content platforms, e.g., in response to the digital component request and/or already stored at the client device in the collection. For example, the confidence logic module of a content platform can be configured to select one or more digital components based on the confidence scores for the content platform's digital components and provide the one or more digital components as candidates for the selection process being conducted by the client device for the digital component request.

The client device can present (255) the selected digital component using various techniques. For example, the client device can insert the digital component in a digital component slot of content being presented. In another example, the client device can present the digital component by rendering the digital component in a graphical user interface window, in a web browser, or in another application. In further examples, if the digital component includes video, the client device can render the digital component in a video player application, and if the digital component includes audio, the client device can render the digital component in an audio player application.

Figure 3:
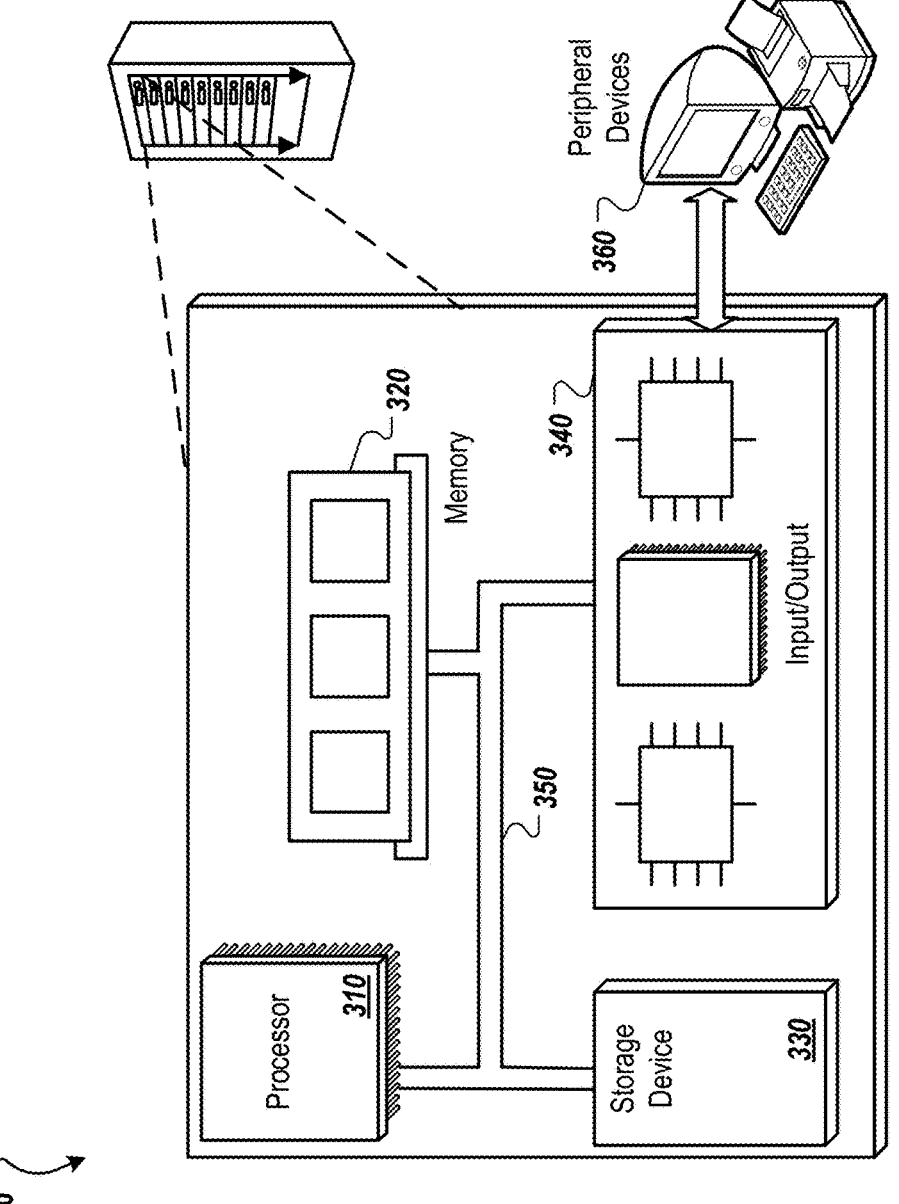
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:

receiving, from a client device and by a first content platform, a digital component request that requests one or more digital components for presentation at the client device and that comprises contextual data describing an environment in which the one or more digital components will be presented;

determining, based on the contextual data, to add a user of the client device to one or more first interest groups;

selecting, based on the contextual data, a digital component for distribution to the client device; and providing, to the client device, the selected digital component and instruction data that causes the client device to:

update, for each of the one or more first interest groups, a membership confidence measure that is based at least in part on a membership count that indicates a number of times that the user has been added to the first interest group and represents a predicted likelihood that the user of the client device is interested in a topic of the first interest group; and include the selected digital component in a digital component selection process performed by the client device to select, from multiple digital components received from multiple content platforms, a given digital component for presentation to the user of the client device, wherein the selection process selects the given digital component based on membership confidence measures for interest groups that include the user as a member.

2. The computer-implemented method of claim 1, wherein the instruction data comprises a confidence logic module that comprises executable instructions configured to produce, for each individual digital component of the multiple digital components, a confidence score that indicates a likelihood that the user of the client device is interested in the individual digital component.

3. The computer-implemented method of claim 1, wherein the instruction data comprises a reference to a confidence logic module located on a separate computing system that is configured to produce, for each individual digital component of the multiple digital components, a confidence score that indicates a likelihood that the user of the client device is interested in the individual digital component.

4. The computer-implemented method of claim 1, wherein the digital component selection process performed by the client device comprises:

executing a plurality of confidence logic modules, each confidence logic module of the plurality of confidence logic modules is provided by a different content platform of the multiple content platforms and is configured to produce a confidence score for each of multiple digital components received from the different content platforms; and selecting, based at least in part on the confidence scores, the given digital component for presentation to the user.

5. The computer-implemented method of claim 1, further comprising:

receiving, from the client device and by the first content platform, an additional digital component request that requests one or more additional digital components for presentation at the client device and that comprises additional contextual data describing an environment in which the one or more additional digital components will be presented;

determining, based on the contextual data, to add a user of the client device to one or more second interest groups, wherein at least one of the second interest groups differs from each of the one or more first interest groups;

selecting, based on the additional contextual data, a second digital component for distribution to the client device; and providing, to the client device, the second digital component and additional data that causes the client device to:

update, for each of the one or more second interest groups, a second membership count that represents a second predicted likelihood that the user of the client device is interested in a topic of the second interest group; and include the second digital component in an additional digital component selection process performed by the client device to select, from multiple additional digital components received from the multiple content platforms, an additional given digital component for presentation to the user of the client device.

6. The computer-implemented method of claim 5, wherein the digital component request and the additional digital component request are configured to prevent the first content platform from correlating the digital component request with the additional digital component request.

7. The computer-implemented method of claim 1, wherein determining, based on the contextual data, to add a user of the client device to the one or more first interest groups comprises processing an input that includes the contextual data using a machine learning model that is trained to produce as output group identifiers for interest groups.

8. A system comprising:

one or more processors; and one or more storage devices storing instructions that, when executed by the one or more processors, cause the one or more processors to perform operations comprising:

receiving, from a client device and by a first content platform, a digital component request that requests one or more digital components for presentation at the client device and that comprises contextual data describing an environment in which the one or more digital components will be presented;

determining, based on the contextual data, to add a user of the client device to one or more first interest groups;

selecting, based on the contextual data, a digital component for distribution to the client device; and providing, to the client device, the selected digital component and instruction data that causes the client device to:

update, for each of the one or more first interest groups, a membership confidence measure that is based at least in part on a membership count that indicates a number of times that the user has been added to the first interest group and represents a predicted likelihood that the user of the client device is interested in a topic of the first interest group; and include the selected digital component in a digital component selection process performed by the client device to select, from multiple digital components received from multiple content platforms, a given digital component for presentation to the user of the client device, wherein the selection process selects the given digital component based on membership confidence measures for interest groups that include the user as a member.

9. The system of claim 8, wherein the instruction data comprises a confidence logic module that comprises executable instructions configured to produce, for each individual digital component of the multiple digital components, a confidence score that indicates a likelihood that the user of the client device is interested in the individual digital component.

10. The system of claim 8, wherein the instruction data comprises a reference to a confidence logic module located on a separate computing system that is configured to produce, for each individual digital component of the multiple digital components, a confidence score that indicates a likelihood that the user of the client device is interested in the individual digital component.

11. The system of claim 8, wherein the digital component selection process performed by the client device comprises:

executing a plurality of confidence logic modules, each confidence logic module of the plurality of confidence logic modules is provided by a different content platform of the multiple content platforms and is configured to produce a confidence score for each of multiple digital components received from the different content platforms; and selecting, based at least in part on the confidence scores, the given digital component for presentation to the user.

12. The system of claim 8, wherein the operations comprise:

receiving, from the client device and by the first content platform, an additional digital component request that requests one or more additional digital components for presentation at the client device and that comprises additional contextual data describing an environment in which the one or more additional digital components will be presented;

determining, based on the contextual data, to add a user of the client device to one or more second interest groups, wherein at least one of the second interest groups differs from each of the one or more first interest groups;

selecting, based on the additional contextual data, a second digital component for distribution to the client device; and providing, to the client device, the second digital component and additional data that causes the client device to:

update, for each of the one or more second interest groups, a second membership count that represents a second predicted likelihood that the user of the client device is interested in a topic of the second interest group; and include the second digital component in an additional digital component selection process performed by the client device to select, from multiple additional digital components received from the multiple content platforms, an additional given digital component for presentation to the user of the client device.

13. The system of claim 12, wherein the digital component request and the additional digital component request are configured to prevent the first content platform from correlating the digital component request with the additional digital component request.

14. The system of claim 8, wherein determining, based on the contextual data, to add a user of the client device to one the or more first interest groups comprises processing an input that includes the contextual data using a machine learning model that is trained to produce as output group identifiers for interest groups.

15. A non-transitory computer-readable medium carrying instructions that, when executed by one or more processors, cause the one or more processors to perform operations comprising:

receiving, from a client device and by a first content platform, a digital component request that requests one or more digital components for presentation at the client device and that comprises contextual data describing an environment in which the one or more digital components will be presented;

determining, based on the contextual data, to add a user of the client device to one or more first interest groups;

selecting, based on the contextual data, a digital component for distribution to the client device; and providing, to the client device, the selected digital component and instruction data that causes the client device to:

update, for each of the one or more first interest groups, a membership confidence measure that is based at least in part on a membership count that indicates a number of times that the user has been added to the first interest group and represents a predicted likelihood that the user of the client device is interested in a topic of the first interest group; and include the selected digital component in a digital component selection process performed by the client device to select, from multiple digital components received from multiple content platforms, a given digital component for presentation to the user of the client device, wherein the selection process selects the given digital component based on membership confidence measures for interest groups that include the user as a member.

16. The method of claim 1, wherein the instruction data causes the client device to update a vector of confidence indices with, for each of the one or more first interest groups, a confidence index that indicates a likelihood that the user of the client device is interested in a topic of the first interest group, and wherein the membership confidence measure for each first user interest group is based on an aggregation of confidence indices for the first interest group.

17. The computer-implemented method of claim 1, wherein the instruction data causes the client device to:

identify, for each digital component of the multiple digital components, each first interest group that is relevant to the digital component; and determine, for each digital component of the multiple digital components, a confidence score that indicates a likelihood that the user of the client device is interested in the individual digital component, wherein the confidence score for a digital component is based on the membership confidence measure for each first interest group that is relevant to the digital component.

* * * * *